United States Patent [19]

Saito et al.

[11] 4,093,819

[45] June 6, 1978

[54] CLOSED USER GROUP FACILITY

[75] Inventors: Kyuta Saito, Hoya; Fukuya Ishino, Kodaira, both of Japan

[73] Assignee: Nippon Telegraph and Telephone Public Corporation, Tokyo, Japan

[21] Appl. No.: 742,673

[22] Filed: Nov. 17, 1976

[30] Foreign Application Priority Data

Nov. 29, 1975 Japan .................................. 50-143489

[51] Int. Cl.$^2$ ........................................... H04L 11/00
[52] U.S. Cl. .................................... 178/2 R; 178/2 B; 178/4.1 R
[58] Field of Search .............. 178/2 R, 2 B, 2 C, 2 D, 178/2 E, 4.1 R, 4.1 B, 3, 23 A; 179/2 DP, 2 A; 340/172.5, 152 T, 146.1 C

[56] References Cited

U.S. PATENT DOCUMENTS

| 3,206,728 | 9/1965 | Baumgart et al. | 340/152 T |
| 3,993,980 | 11/1976 | Moreton | 340/172.5 |

FOREIGN PATENT DOCUMENTS 1,185,213  5/1961  Germany .............................. 178/2 R Primary Examiner—Thomas A. Robinson

[57] ABSTRACT

A closed user group facility in a data transmission system which has a closed user group of terminals accomodated in a switching network, and in which the switching network registers a terminating terminal in response to a request for registration of that designated terminating terminal from another one of the terminals. The registration of the corresponding terminating terminal is with one of codes with which all the terminals accommodated in the switching network can be individually identified. Subsequently when transmitting data (including voice data) from the originating terminal to the terminating one, the switching network controls to permit the transmission of the data from the originating terminal to the terminating one when the switching network has verified that the originating and terminating terminals had already been mutually registered as distant terminals.

4 Claims, 5 Drawing Figures

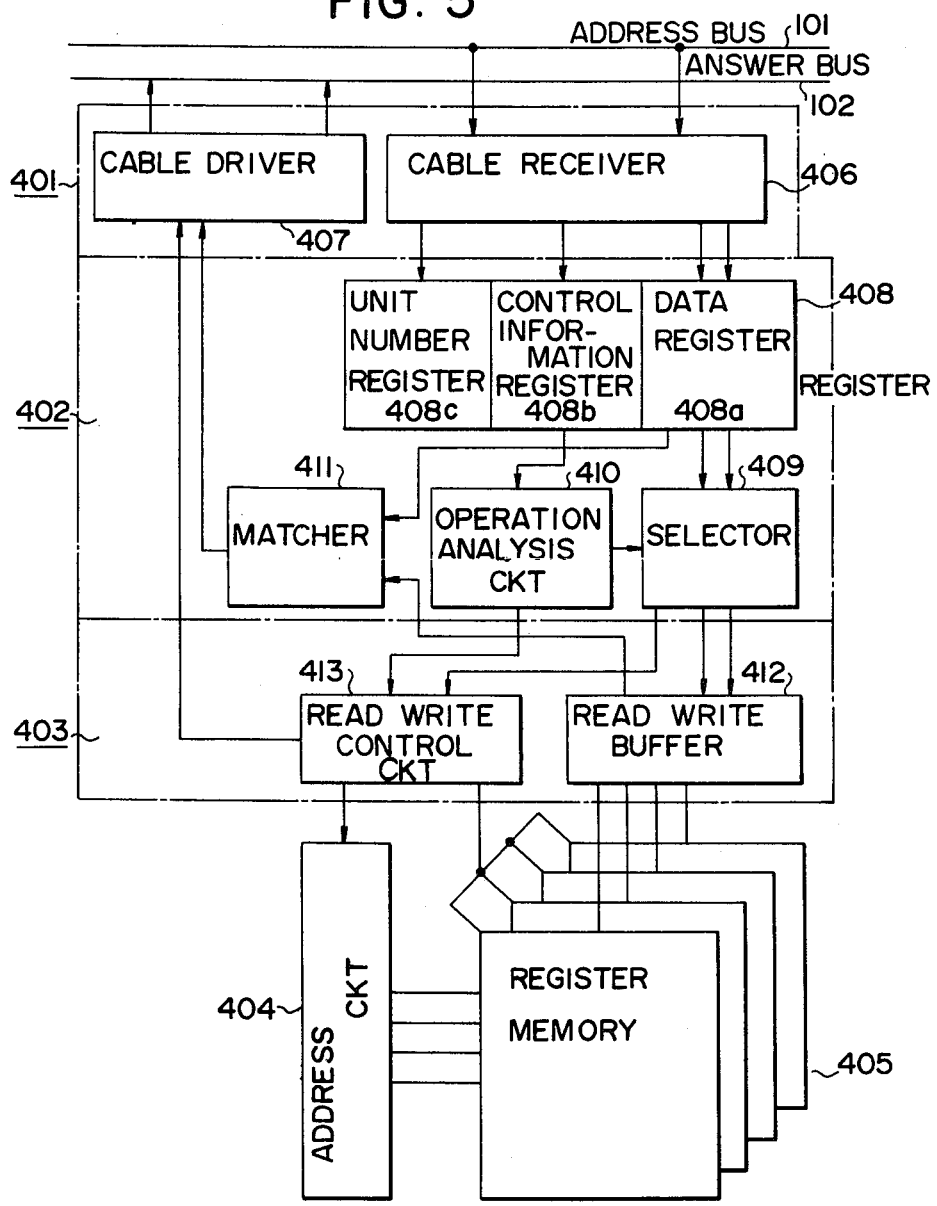

CLOSED USER GROUP FACILITY

BACKGROUND OF THE INVENTION

1. Field of the Invention

This invention relates to a closed user group facility, and more particularly to a closed user group facility in which those terminals accomodated in a switching network which are already registered mutually as distant terminals, form closed user groups; and the switching network ensures smooth transmission between the terminals in the closed user group, and at the same time, prevents the transmission in the closed user group from being disturbed by terminals belonging to other groups.

2. Description of the Prior Art

Main methods in a conventional closed user group facility in switching networks are the identify code method and the group code method. In the identify code method, the switching office having received a request to send from an originating terminal sends to a terminating terminal an identify code indicative of a closed user group. The terminating terminal decides whether or not the identify code is coincident with that of the closed user group to which the terminating terminal belongs, and receives data from the originating terminal only in the case of coincidence.

This method requires the provision of the identify code deciding function in each terminal, and hence has a demerit that the terminal is costly. Further, whether or not a request for the closed user group service is proper is decided by deciding the identify code sent to the terminating terminal, and there are some cases where a subscriber line and an intermediate line are held ineffective, so that the transmission efficiency of the network is lowered.

In the group code method, upon receipt of a request to send from a terminal, a switching office of a network discriminates the group codes of the closed user groups of the originating terminal from the subscriber data of the switching office, and sends out the group code to a switching office having accomodated therein the terminating terminal. The terminating office decides whether or not the group code of the closed user group to which the terminating terminal belongs is coincident with one of the group codes received from the originating office, and only in the case of coincidence, permits transmission between the originating and terminating terminals.

This method requires the switching network to collectively manage all the group codes of the network for maintenance and management of the closed user groups, and has a defect in the cost for maintenance and management of the network attendant with the numbering plan of the group code and entry and withdrawal of the terminal use in or withdrawal from the group. Further, the originating office is required to send to the terminating terminal all of the group codes of the originating terminal, and the terminating office is required to match its group code with all the group codes of the originating terminal at each request for transmission. This leads to a defect that a load to the switching equipment increases. Moreover, it is necessary to inquire of the terminating office about the appropriateness of the request for the closed user group service from the originating terminal. Granting that ineffective holding of the subscriber line and intermediate line does not occur as many times as in the abovesaid identify code method, the transmission efficiency of the network is still low.

SUMMARY OF INVENTION

This invention is to provide a closed user group service which is free from the abovesaid defects of the prior art, and is designed so that the closed user group service is permitted only between terminals mutually registered, thereby to ensure smooth transmission in the closed user group, and to eliminate disturbance of transmission by other groups and alleviate processing in the terminal and in the switching office.

Briefly stated, according to this invention, in the closed user group facility having a closed user group of terminals accomodated in a switching network for transmission, there are provided means for registering, based on a terminal registration request from an originating one of the terminals, a terminating terminal corresponding thereto with one of codes with which all the terminals accomodated in the switching network can be identified individually, means for verifying the presence of a code indicative of registration of the originating and terminating terminals, and means for controlling data transmission based on the result of verification of the abovesaid registration. The terminals requesting the closed user group service previously register in the switching network the codes capable of mutual identification of the terminals, and in compliance with a request for the closed user group service, the data transmission is controlled only where the originating and terminating terminals have already been mutually registered. The originating terminal mentioned above is one which has called for transmission or registration but is capable of data transmission and reception in practice. The terminating terminal is one which received data transmitted from the originating terminal but is similarly capable of data transmission and reception in practice, and also implies a terminal which the originating terminal has requested to register.

BRIEF DESCRIPTION OF THE DRAWINGS

FIG. 5 is a block diagram of a closed user group service adapter for use in this invention.

DESCRIPTION OF THE PREFERRED EMBODIMENTS

Figure 1:
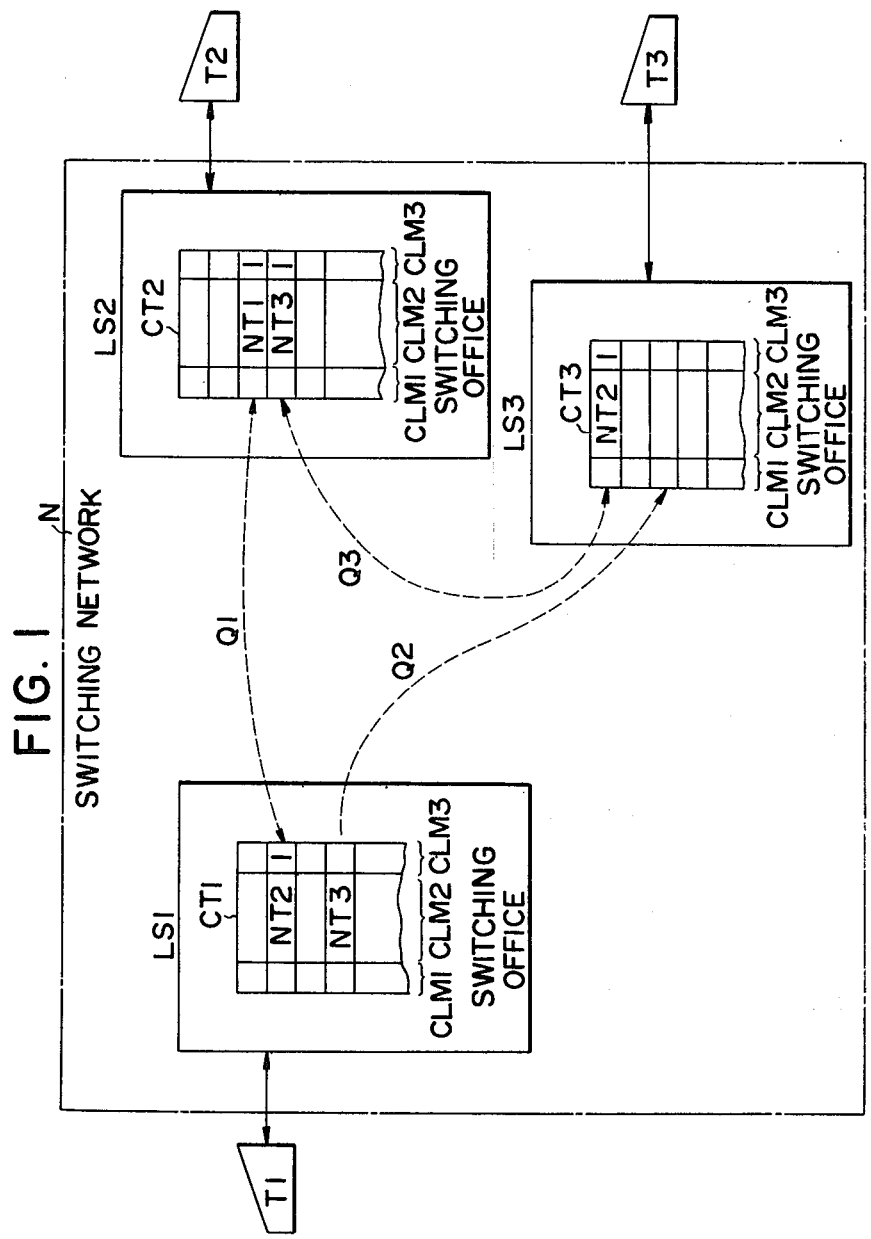
FIG. 1 is an explanatory diagram of one embodiment of this invention.

FIG. 1 is an explanatory diagram of one embodiment of this invention. Reference characters T1 to T3 indicate terminals accomodated in a switching network N; LS1 to LS3 designate switching offices in the switching network N; CT1 to CT3 identify closed user group entry tables corresponding to the terminals T1 to T3, which tables are respectively accomodated in the switching offices LS1 to LS3, each table having areas such, for example, as an abbreviation code column CLM1, a subscriber code column CLM2 and a mutual registration verify column CLM3.

The following description will be given of the operation in the case where the switching offices LS1 to LS3 respectively have the closed user group entry tables CT1 to CT3, each having the subscriber code column CLM2 and the mutual registration verify colum CLM3.

For example, the switching office LS1, which has received from the terminal T1 request for the registration of the terminals T2 and T3 as its designated terminating terminals in the closed user group service, registers codes NT2 and NT3 (with which all the terminals accomodated in the switching network can be individually identified) of the terminals T2 and T3 in the subscriber code column CLM2 of the closed user group entry table CT1 corresponding to the terminal T1. Similarly, in the case of a request from the terminal T2 for the registration of the terminals T1 and T3 as terminating terminals in the closed user group service, and a request from the terminal T3 for registration of the terminal T2 as a terminating terminal, the switching office LS2 registers codes NT1 and NT3 of the terminals T1 and T3 in the closed user group entry table CT2, and the switching office LS3 registers the code NT2 of the terminal T2 in the closed user group entry table CT3.

After having registered the code or codes of the terminating terminal or terminals in the closed user group entry table, each swiching office inquires of the switching office having accomodated therein the abovesaid registered terminating terminal as to whether or not it is registered in the closed use group entry table of the latter switching office, as indicated by broken lines Q1 to Q3. If the terminating terminal is verified to be registered as a result of the inquiry, it is indicated in the mutual registration verify columns CLM3 corresponding to the subscriber code columns CLM2 in the closed user group entry tables of both switching offices. In the illustrated example, "1" is written to indicate that the mutual registration has been verified.

Accordingly, after the registration of the codes NT2 and NT3 of the terminals T2 and T3 in the subscriber code column CM2 of the closed user group entry table CT1 of the switching office LS1, and after the registration of the code NT1 of the terminal T1 in the subscriber code column CLM2 of the closed user group entry table CT2 of the switching office LS2, the switching office LS2 inquires of the switching office LS1 having accomodated therein the terminal T1 as to whether or not the code NT2 of the terminal T2 has been registered in the closed user group entry table CT1 corresponding to the terminal T1. In this case, since it can be known from an answer from the switching office LS1 that the code NT2 of the terminal T2 has already been registered, the switching office LS2 writes "1" in the mutual registration verify column CLM3 of the closed user group entry table CT2 corresponding to the subscriber code column CLM2 having registered therein the code NT1. On the other hand, based on a notice from the switching office LS2, the switching office LS1 writes "1" in the mutual registration verify column CLM3 of the closed user group entry table CT1 corresponding to the subscriber code column CLM2 having registered therein the code NT2.

In a likewise manner, "1" is written in the mutual registration verify column CLM3 of the closed user group entry table CT2 corresponding to the subscriber code column CLM2 having registered therein the code NT3, and in the mutual registration verify column CLM3 of the closed user group entry table CT3 corresponding to the subscriber code column CLM2 having registered therein the code NT2. For the transmission between the terminals, it is necessary that their codes are mutually registered in the closed user group entry tables of the both terminals. Consequently, in the illustrated embodiment, transmission is possible between the terminals T1 and T2, and betwen the terminals T2 and T3, but is impossible between the terminals T1 and T3 because the code NT1 of the terminal T1 has not been registered in the closed user group entry table CT3.

Thus, pairs of the terminals T1 and T2 and the terminals T2 and T3 each form one closed user group. If the code NT1 of the terminal T1 is registered in the closed user group entry table CT3 of the terminal T3, the terminals T1, T2 and T3 form one closed user group to permit a closed user group service among them.

Next, a description will be given of the procedure for the transmission between the terminals. When the terminal T1 has requested the switching office LS1 for transmission to the terminal T2, the switching office LS1 checks the closed user group entry table CT1 of the terminal T1, and in this case, since the code NT2 of the terminal T2 has already been registered and since "1" has also been written-in the mutual registration verify column CLM3, the switching office LS1 achieves a control so that data from the terminal T1 may be transmitted to the terminal T2 through the switching office LS2. Also in the case of a request for transmission from the terminal T2 to T1, the switching office LS2 follows the same procedure as described above to transmit data from the terminal T2 to T1 through the switching office LS1.

On the other hand, in the case of a request for transmission between the terminals which do not belong to the same closed user group, for example, in the case of a request for transmission from the terminal T1 to T3, the switching office LS1 checks the closed user group entry table CT1 of the terminal T1, and in this case, finds that the code NT3 of the terminal T3 has been registered, but that since "1" has not been written in the mutual registration verify column CLM3 corresponding to the code NT3, the terminal T3 does not belong to the closed user group of the terminal T1, and as a result of this, the switching office LS1 does not permit data transmission from the terminal T1 to T3.

Also in the case of a request for transmission from the terminal T3 to T1, the switching office LS3 refuses the request of the terminal T3, since the code NT1 of the terminal T1 has not been registered in the closed user group entry table CT3 of the terminal T3.

Figure 2:
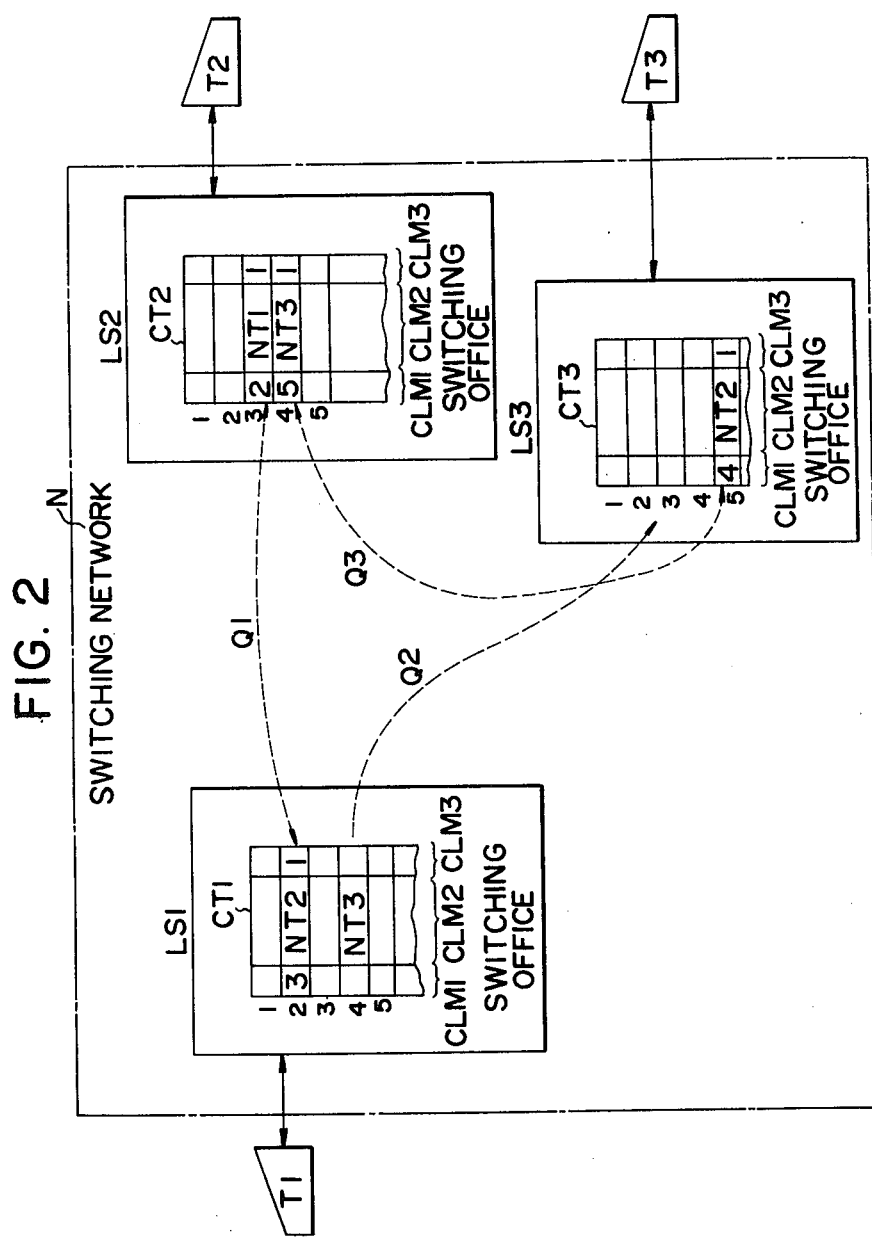
FIG. 2 is an explanatory diagram of another embodiment of this invention.

FIG. 2 is a diagram explanatory of another embodiment of this invention, and in FIG. 2, the same reference characters as those in FIG. 1 identify the same parts. In this embodiment, the code of the terminating terminal in the transmission between terminals is registered corresponding to an abbreviation code. For instance, where the terminal T1 has requested the switching office LS1 to register the terminal T2 as the terminating terminal in the form of an abbreviation code "2," the switching office LS1 writes the code NT2 of the terminal T2 in the subscriber code column CLM2 which is the second row of the closed user group entry table CT1. Thereafter, when the terminal T1 designates the terminal T2, the code NT2 of the terminal T2 need not be designated, but instead the abbreviation code "2" is designated. The abbreviation code "2" signifies that the code NT2 of the terminal T2 has been registered in the "second row" of the closed user group entry table CT1 of the terminal T1.

Likewise, when requested by the terminal T1 to register the terminal T3 as the terminating terminal with an abbreviation code "4," the switching office LS1 registers the code NT3 of the terminal T3 in the subscriber code column CLM2 which is the fourth row of the closed user group entry table CT1.

When the switching office LS2 has received from the terminal T2 a request for the registration of the terminals T1 and T3 with abbreviation codes "3" and "4," respectively, the switching office LS2 writes the codes NT1 and NT3 of the terminals T1 and T3 in the subscriber code columns CLM2 of the third and fourth rows of the closed user group entry table CT2, respectively.

After the registration of the code NT1 of the terminal T1 in the closed user group entry table CT2, the switching office LS2 inquires of the switching office LS1 having accomodated therein the terminal T1 as to whether or not the terminal T2 has been registered. In the present embodiment, since the terminal T2 has already been registered in the switching office LS1, as described previously, "1" is written in the mutual registration verify column CLM3 of the third row of the closed user group entry table in the switching office LS2. Further, the abbreviation code "2," defined by the terminal T1 with respect to the terminal T2, is written in the abbreviation code column CLM1. The abbreviation code "2" is transferred from the switching office LS1 to LS2, together with the information that the terminal T2 has been registered as the terminating terminal of the terminal T1.

Further, in the switching office LS1, it is learned from a notice from the switching office LS2 that mutual registration of the terminals T1 and T2 has been completed, so that "1" is indicated in the mutual registration verify column CLM3 of the second row of the closed user group entry table CT1, and based on the information from the terminal LS2, the abbreviation code "3," defined by the terminal T2 with respect to the terminal T1, is written in the abbreviation code column CLM1.

In a similar manner, between the terminals T2 and T3, the terminal T2 defines the terminal T3 with the abbreviation code "4," and the terminal T3 defines the terminal T2 with an abbreviation code "5." This is shown in FIG. 2.

What is written in the abbreviation code column CLM1 of the closed user group entry table is the abbreviation code which the terminal written in the subscriber code column of the same row as the abovesaid abbreviation code column has defined with respect to the terminal corresponding to the abovesaid closed user group entry table. Accordingly, in the case where "3" has been written in the subscriber code column CLM1 of the second row of the closed user group entry table CT1, it is indicated that the abbreviation code for the designation of the terminal T1 by the terminal T2 is "3."

The abbreviation codes employed by one terminal for other terminals are each defined with respect to each terminal alone. In other words, the terminal T1 designates the terminal T2 with the abbreviation code "2," but the abbreviation code for the designation of the terminal T2 by the terminal T3 is not "2" but "4" in the illustrated embodiment.

Next, a description will be made of the procedure for the closed user group service employing the abbreviation codes.

In the case of transmission from the terminal T1 to T2, it is sufficient for the terminal T1 only to designate the abbreviation code "2" to the switching office LS1. Based on the abbreviation code "2" notified from the terminal T1, the switching office LS1 reads out the second row of the closed user group entry table CT1 to learn from the subscriber code column CLM2 of the second row that the abbreviation code "2" indicates the terminal NT2 as the terminating terminal, and finds out that the mutual registration has been completed, based on the fact that the mutual registration verify column CLM3 is "1." As a result of this, the switching office LS1 immediately notifies the switching office LS2 having accomodated therein the terminating terminal T2 of the code NT2 of the terminal T2 and the abbreviation code "3" entered in the abbreviation code column CLM1.

The switching office LS2 checks the closed user group entry table CT2 corresponding to the terminal T2, based on the terminal code NT2 notified from the switching office LS1. Further, based on the abbreviation code "3" notified from the switching office LS1, the switching office LS2 reads the third row of the closed user group entry table CT2 to learn the request for transmission from the terminal T1. This eliminates the necessity of searching the rows of the closed user group entry table CT2 one after another, thus alleviating the processing in the switching office LS2.

In the case of notifying the terminal T2 of a calling from the terminal T1, the switching office LS2 sends to the terminal T2 the abbreviation code "3" sent from the switching office LS1, thereby enabling the terminal T2 to readily learn from the abbreviation code "3" that the calling has come the terminal T1.

Figure 3:
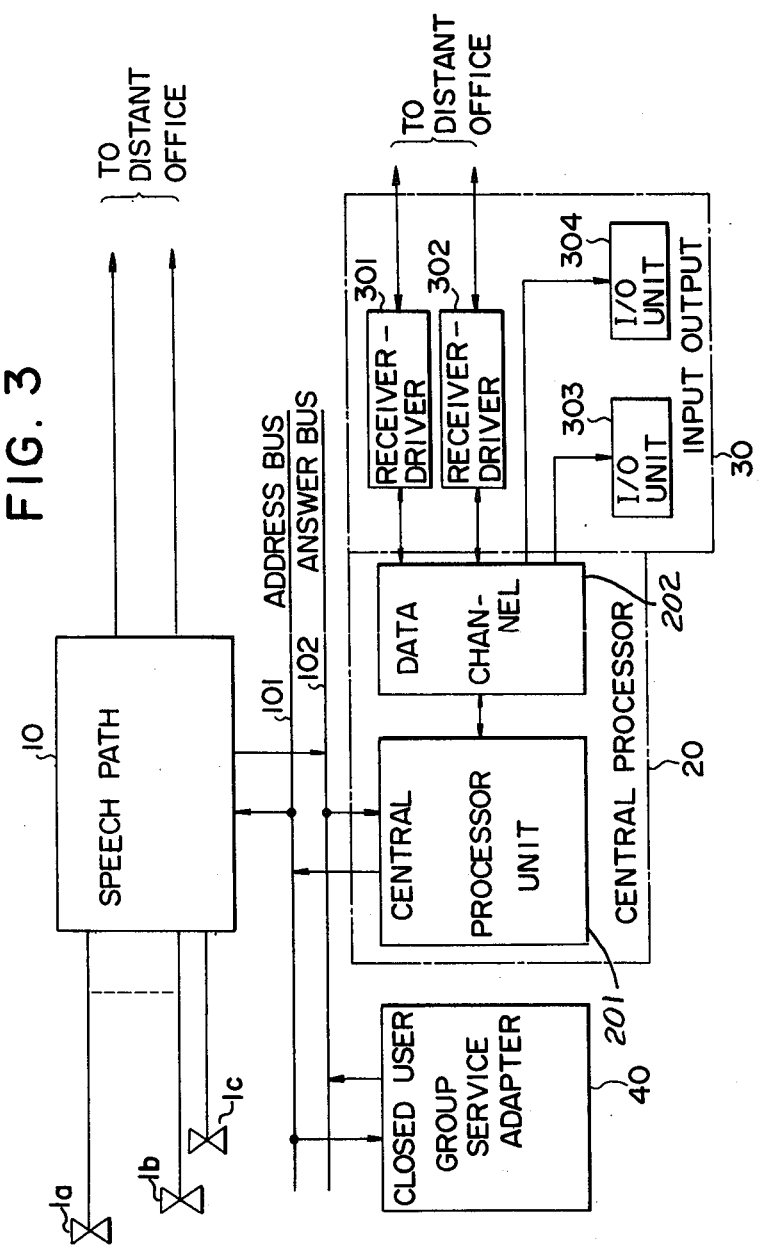
FIG. 3 is a block diagram of a switching equipment embodying this invention.

FIG. 3 is a block diagram of a line switching equipment embodying this invention. The illustrated line switching equipment comprises a speech path 10, a central processor 20, an input output 30 and a closed user group service adapter 40. The speech path 10 has accomodated therein terminals 1a, 1b, 1c, ... The central processor 20 is composed of a central processor unit 201 and a data channel 202; and the input output 30 is comprised of receiver-drivers 301 and 302 used for inter-office signalling and input/output units 303 and 304. The speech path 10 and the closed user group service adapter 40 are interconnected through the central processor 20, an address bus 101 and an answer bus 102.

Figure 4:
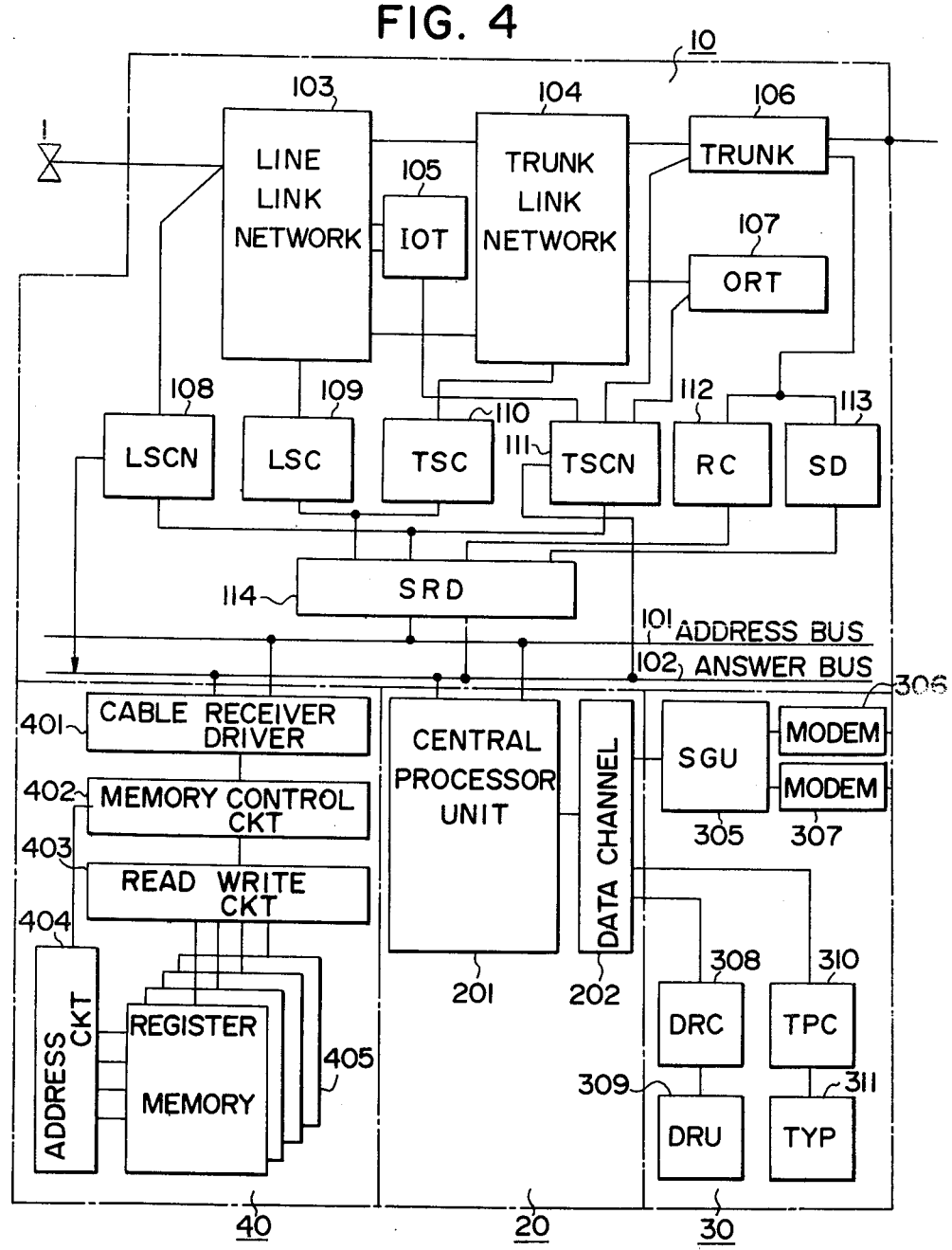
FIG. 4 is a block diagram showing in detail the switching equipment of FIG. 3.

FIG. 4 is a block diagram illustrating in detail the line switching equipment depicted in FIG. 3. The speech path 10 comprises the address bus 101, the answer bus 102, a line link network 103 having accomodated therein subscriber lines, a trunk link network 104 having accomodated therein a speech trunk and a signal trunk, an intra-office trunk (IOT) 105 for intra-office connection, a trunk 106 accomodated in the trunk link network 104, an originating register trunk 107 generally indicating a dial signal receiver for a rotary dial and a touch tone dial, a line scanner (LSCN) 108 a line switch controller (LSC) 109, a trunk switch controller (TSC) 110, a trunk scanner (TSCN) 111, a relay controller (RC) 112, a signal distributor (SD) 113 and a signal receiver and distributor (SRD) 114 serving as an interface for information transmission and reception with respect to the central processor unit 201.

The input output 30 comprises an inter-office signal transmitter-receiver (SGU) 305, modems 306 and 307, a magnetic drum controller (DRC) 308, a magnetic drum unit (DRU) 309, a typewriter controller (TPC) 310 and a typewriter (TYP) 311. The parenthesized alphabets show abbreviations of the respective parts.

The closed user group service adapter 40 comprises a cable receiver driver 401, a memory control circuit 402, a read-write circuit 403, an address circuit 404 and registration memories 405 forming the closed user group entry tables described previously in connection with FIGS. 1 and 2.

The illustrated line switching equipment is similar in construction to ordinary line switching equipments except the closed user group service adapter 40, and its operation is set forth in detail, for instance, in U.S. Pat. No. 3,569,939 and "THE BELL SYSTEM TECHNICAL JOURNAL," Vol. 43, No. 5, September, 1964. Accordingly, no description will be given of ordinary switching and connecting operations.

A call of the terminal 1 is detected by monitoring the DC levels of the subscriber lines by periodic scanning of the line scanner 108. Upon detection of the call, the line scanner 108 sends the detected information to the central processor unit 201 together with information of the subscriber accomodation position. The central processor unit 201 applies commands to the line switch controller 109 and the trunk switch controller 110 to interconnect the calling terminal and the originating register trunk 107 to make preparations for the reception of a dial signal.

The originating register trunk 107 receives and stores therein the dial signal (a rotary dial signal, a touch tone dial signal or an ordinary character dial signal) delivered out from the terminal.

In this case, the terminal employs different formats of the dial signal so as to notify the switching equipment of whether the call is a request for the registration of a subscriber of a closed user group or an actual closed user group service or a request for other ordinary transmission. For example, in the case of the request for the closed user group entry "$\alpha, X_1, X_2, X_3, X_4, \ldots X_n$," is used as the format of the dial signal, $\alpha$ being a character indicative of the registration of the terminating terminal of the closed user group service, and not being used for the request for the ordinary transmission service, and $X_1$ to $X_n$ being the numbers of the terminating terminals of the closed user group service.

In the case of the request of registration of the terminating terminal of the closed user group service, it is identified by $\alpha$ leading the aforesaid dial signal, and the central processor unit 201 commands the registration memory 405 to write therein the code of the designated terminating terminal of the closed user group service. This command is received by the cable receiver driver 401 to control the address circuit 404 with the memory control circuit 402, by which the code of the terminal is written in the address of the registration memory 405 designated by the address circuit 404 from the read-write circuit 403. The central processor unit 201 inquires of the switching equipment having accomodated therein the terminating terminal just registered as to whether or not the code of the registration requesting terminal has been entered in the registration memory of the desired terminating terminal, and if registered, the indication of verification, for example, "1," is written in the mutual registration verify columns of the both terminals. Such an interconnection of the switching equipments is achieved through the inter-office signalling equipment 305.

The inter-office signalling equipment 305 is for transmission and reception of a switching network control signal, a terminal connecting signal, a charging signal and other signals between switching equipments. In this embodiment, it is based on Specification of Signalling System No. 6 In Geneva Convention of the International Telegraph and Telephone Consultative Committee, 1972.

Where the dial signal from the calling terminal is $X_1, X_2, X_3, \ldots X_n$, since it does not include $\alpha$ at its head, the central processor unit 20 decides that the signal is a request for closed user group service with a terminal having the terminal code $X_1, X_2, X_3, \ldots X_n$. Then, the central processor unit 201 issues a command to the closed user group service adapter 40 to search the closed user group registration memory 405 corresponding to the originating terminal to check whether or not the code of the terminating terminal has been registered in the memory 405 and whether or not "1" has been indicated in the mutual registration verify column. As a result of this, where the mutual registration has already been completed, the switching equipment performs an operation of connecting the originating terminal to the terminating terminal corresponding to the dial signal of the former.

In the case where the terminating terminal of the closed user group service is accomodated in the same switching equipment as the originating terminal, they are interconnected through the intra-office trunk 105. Where the terminating terminal is accomodated in a switching equipment different from that of the originating terminal, the originating switching equipment sends information for connection to an intermediate switching equipment and the terminating switching equipment through the inter-office signalling equipment 305. Upon receipt of this information, the intermediate switching equipment and the terminating switching equipment actuate the line switch controller to connect the originating terminal to the terminating one.

FIG. 5 is a block diagram of the closed user group service adapter. The cable receiver-driver 401 in FIG. 4 is shown to be composed of a cable receiver 406 and a cable driver 407. The memory control circuit 402 comprises a register 408 including a data register 408a, a control information register 408b and a unit number register 408c, a selector 409, an operation analysis circuit 410 and a matcher 411. The read-write circuit 403 comprises a read-write buffer 412 and a read-write control circuit 413. As for the construction of each of the abovesaid parts, it is possible to adopt, for example, the construction of a memory control circuit for use in an information processor unit.

The units connected to the address bus 101 are respectively assigned unit numbers, and designed so that a a signal delivered out from the central processor unit to the address bus 101 is selectively received only by the unit whose unit number is one designated by the central processor unit.

In the case of registration of the terminating terminal, the unit number of the closed user group service adapter, control information and the code of the terminal requesting for registration are delivered out from the central processor unit to the address bus 101, and set in the register 408 through the cable receiver 406. The control information is to indicate that the content set in the data register 408a is the code of the registration requesting terminal, and in the operation analysis circuit 410, the control information is analyzed and identified. As a result of analysis of the control information in the operation analysis circuit 410, signals are applied to the selector 409 and the read-write control circuit 413 to send the terminal code set in the data register 408a to the address circuit 404 through the selector 409 and the read-write control circuit 413, thereby selecting the closed user group registration memory 405 corresponding to the registration requesting terminal. The read-write control circuit 413 searches the selected registration memory 405 for a vacant entry (the subscriber code column CLM2 in which no terminal code has yet been registered).

Next, since the terminating terminal code is sent out from the central processor unit together with the unit number and the control information, the control information is analyzed by the operation analysis circuit 410 to detect that the content set in the data register 408a is the code of the terminating terminal, and the terminating terminal code is sent to the read-write buffer 412 through the selector 409 to write the terminating terminal code in the selected registration memory 405 circuit 413. Upon completion of this write, the read-write control circuit 413 informs the answer bus 102 of the completion of the write operation through the cable driver 407. The central processor unit receives the information through the answer bus 102, and inquires of the switching equipment having accomodated therein the registered terminating terminal to verify whether or not the registration requesting terminal has already been registered in the registration memory corresponding to the terminating terminal.

In the case where an answer is obtained to the effect that the registration requesting terminal has already been registered, "1" is written in the mutual registration verify column CLM3 of the registration memory 405.

In the case of the closed user group service, the central processor uni delivers out the code of the originating terminal (identified by the terminal call detection in the central processor unit) to the address bus 101. Based on the code of the originating terminal, the registration memory 405 corresponding to the originating terminal is searched. Then, the central processor unit sends out to the address bus 101 the code of the terminating terminal dialled by the originating terminal. The code of the terminating terminal is held in the data register 408a, and the subscriber code column CLM2 and the mutual registration verify column CLM3 of the registration memory 405 corresponding to the originating terminal are read out entry by entry. In the matcher 411, the terminal code held in the data register 408a is matched with each of the terminal codes of the subscriber code columns CLM2 sequentially read out as mentioned out, and if they re coincident with each other, the matcher 411 checks the mutual registration verify column CLM3 as to whether it is "1" or not. In the case of "1," information is sent to the central processor unit through the answer bus 102. Upon receipt of this information, the central processor unit starts a switching operation for the closed user group service.

When the mutual registration verify column CLM3 is "0," or in the event that the code of the terminating terminal held in the data register 408a is not coincident with any of the terminal codes read out from all the subscriber code columns CLM2 of the registration memory 405 corresponding to the the originating terminal, the central processor unit is informed of it. In this case, the central processor unit refuses the request for the closed user group service.

Next, an example employing the abbreviation code will be described with reference to FIGS. 3, 4 and 5.

In the case of a request for the closed user group entry, the dial signal format used is $\alpha, \beta, X_1, X_2, X_3, \ldots X_n$. $\alpha$ is a character indicative of registration of the terminating terminal of the closed user group service, and is not employed for request for ordinary transmission services. $\beta$ is an abbreviation code and $X_1$ to $X_n$ are the code of the terminating terminal of the closed user group service. For instance, in the case where the terminal T2 having the terminal code of $X_1, X_2, X_3, \ldots X_n$ is registered in the form of an abbreviation code "2," it is designated with $\alpha, 2, X_1, X_2, X_3, \ldots X_n$.

From the leading character $\alpha$ of the dial signal, the central processor unit 201 learns that the dial signal is a request for the registration of the terminating terminal of the closed user group service, and then sends out the unit number of the closed user group service adapter 40, control information and the code of the terminal requesting for registration to the address bus 101. The closed user group service adapter 40 sets the unit number, the control information and the code of the registration requesting terminal in the register 408 through the cable receiver 406. Then, the registration memory 405 corresponding to the registration requesting terminal is selected as is the case with the foregoing embodiment.

Next, the abbreviation code and the code of the terminating terminal are delivered out from the central processor unit 201 to the address bus 101, together with the unit number and the control information. The closed user group service adapter 40 sets the abovesaid information from the central processor unit 201 in the register 408 through the cable receiver 406. The control information is analyzed by the operation analysis circuit 410 to detect that the content set in the data register 408a is the abbreviation code and the terminating terminal code, and the terminating terminal code and the abbreviation code are respectively sent to the read-write buffer 412 and the read-write control circuit 413 through the selector 409. With this abbreviation code, the address circuit 404 designates a row of the previously selected registration memory 405. For example, in the case of the abbreviation being "2," the second row of the registration memory 405 is designated. Under the control of the read-write control circuit 413, the terminating terminal code is written in the subscriber column CLM2 in the designated row of the registration memory 405.

Upon completion of the above write operation, the switching office having accomodated therein the terminating terminal thus registered is inquired of to verify the registration of the registration requesting terminal in the registration memory corresponding to the terminating terminal.

When an answer that the registration requesting terminal has already been registered is obtained, "1" is written in the mutual registration verify column CLM3 of the registration memory 405, and the abbreviation codes mutually designated by the terminals are transferred between the switching offices, and then written in the abbreviation code columns CLM1 of the registration memories 405. For instance, in the case where the terminal T1 registers the terminal T2 with the abbreviation code "2" and the terminal T2 registers the terminal T1 with the abbreviation code "3," as described previously with regard to FIG. 2, the abbreviation code "3," the code NT2 of the terminal T2 and the mutual registration verify indication "1" are written in the second row of the registration memory corresponding to the terminal T1, and the abbreviation code "2," the code NT1 of the terminal T1 and the mutual registration verify indication "1" are written in the third row of the registration memory corresponding to the terminal T2.

To perform the closed user group service, the originating terminal sends the abbreviation code of the registered terminating terminal to the switching office. The switching office identifies the code of the originating terminal based on the information of the accomodated position of the originating terminal, and selects the registration memory 405 corresponding to the originating terminal. The registration memory 405 is read out with the abbreviation code "2," the second row of the registration memory 405 is designated by the address circuit 404, and the abbreviation code column CLM1, the subscriber code column CLM2 and the mutual registration verify column CLM3 are read out, and set in the read-write buffer 412.

When the content of the mutual registration verify column CLM3 has been detected by the matcher 411 to be "1," the central processor unit 201 transfers the abbreviation code and the code of the terminating terminal set in the read-write buffer 412 to the terminating office.

The terminating office performs an operation for the connection to the terminal corresponding to the transferred terminal code. In this case, since the row of the registration memory corresponding to the terminating terminal is immediately known from the transferred abbreviation code, the originating terminal can be readily found out by reading out the subscriber code column of the abovesaid row.

The information between the switching offices in this case is transmitted and received through the data channel 202, the inter-office signalling equipment 305 and the modems 306 and 307, and processing of the information takes places in the central processor unit 201. In the case where the terminating terminal is accomodated in the same switching office as the originating office, it is identified by the central processor unit 201 with the terminating terminal code read out from the registration memory 405 by the abbreviation code from the originating terminal and as dscribed above, if the mutual registration verify column CLM3 is "1," a control for the connection between the originating terminal and the terminating one is achieved through the intra-office trunk (IOT) 105.

Although the foregoing description has been given in connection with the case where the closed user group service adapter 40 is connected to the central processor unit 201 through the address bus 101 and the answer bus 102, it is also possible to provide in the central processor 20 the function of performing the closed user group service by achieving the registration of the terminating terminal of the closed user group service and verification of the mutual registration.

As has been described in the foregoing, in the present invention, since the functions such as verifications and selection of the terminating terminal of the closed user group service and so on are all performed by the switching network, it is possible to eliminate ineffective reservation of a subscriber line and a terminal in the closed user group service, such as experienced in the identify code method, and since the terminal does not require the identify code deciding function, the implementation of the terminal can be made economical.

Further, in the present invention, the switching network does not permit mutual transmission between terminals unless either of them has been registered as the terminating terminal designated by the other. Accordingly, the terminals of each closed user group cannot achieve transmission between them and those of the other user groups. This eliminates the possibility of incidental or accidental jamming or interference between the closed user groups in the closed user group service, and hence permits each terminal user of a certain closed user group to utilize the closed user group service as if having a switching network for the exclusive use of the group.

Moreover, in this invention, in connection with the terminals of the closed user group, verification of the mutual registration, which indicates permission by the switching network of transmission between two terminals, is previously achieved. This eliminates the necessity that at each request to send of the closed user group service, the originating switching office inquires of the terminating switching office as whether or not the designated terminating terminal belongs to the same closed user group, and consequently processing in the switching office is alleviated.

Further, the registration procedure concerning the closed user group service, such as registration in or withdrawal from the closed user group, can be achieved merely by entry or erasure of desired columns of the closed user group entry table by the switching network in accordance with a registration request from a terminal. Maintenance and management of the closed user group need not be achieved by the switching office unlike the conventional group code method, and may be done by the terminal user independently. Accordingly, administrative processing on the side of the switching office atttendant with maintenance and management of the closed user group is alleviated, and a trouble, which is likely to occur between the user and the switching offices owing to a delay or an error in the administrative processing, can be remarkedly prevented.

It will be apparent that many modifications and variations may be effected without departing from the scope of the novel concepts of this invention.

What is claimed is:

1. A closed user group facility having a closed user group of terminals accommodated in a switching network for transmission, comprising:
    means responsive to a terminal registration request from an originating one of the terminals for registering a terminating terminal corresponding to said request with its respective one of codes with which each of the terminals accommodated in the switching network can be respectively identified individually;
    means for verifying whether or not the codes of the originating and terminating terminals have been mutually registered; and
    means for controlling the transmission of data based on the result of verification of the mutual registration of the terminal codes.

2. A closed user group facility according to claim 1 wherein said registering means comprises a register memory in a switching office for writing therein the codes of the terminating terminal and a mutual registration verify indication.

3. A closed user group facility according to claim 2 wherein said data transmission control means comprises means for allowing data transmission only when mutual registration of the originating and terminating terminals is verified by the register memory corresponding to the originating terminal.

4. A closed user group facility according to claim 2 wherein said registering means comprises means for including the code of terminating terminal in the form of an abridged code enabling the originating terminal to identify the terminating terminal, and wherein the data transmission control means comprises means for allowing data transmission only when the code of the terminating terminal designated by the originating terminal is detected from its abridged code and mutual registration of the originating and terminating terminals is verified by the register memory.

* * * * *